United States Patent
Kiriyama

(10) Patent No.: US 10,281,863 B2
(45) Date of Patent: May 7, 2019

(54) IMAGE FORMING DEVICE, TRANSFER MEDIUM CONVEYANCE DEVICE, IMAGE FORMING SYSTEM, AND PROGRAM

(71) Applicant: KONICA MINOLTA, INC., Chiyoda-ku, Tokyo (JP)

(72) Inventor: Tomohiro Kiriyama, Kofu (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/954,980

(22) Filed: Apr. 17, 2018

(65) Prior Publication Data
US 2018/0307170 A1    Oct. 25, 2018

(30) Foreign Application Priority Data
Apr. 25, 2017   (JP) ................................ 2017-086179

(51) Int. Cl.
*G03G 15/00*    (2006.01)
*G06T 7/00*    (2017.01)
*G03G 15/01*    (2006.01)

(52) U.S. Cl.
CPC ......... *G03G 15/5062* (2013.01); *G03G 15/55* (2013.01); *G03G 15/6538* (2013.01); *G06T 7/0002* (2013.01); *G03G 15/01* (2013.01); *G03G 15/6529* (2013.01); *G03G 15/6564* (2013.01); *G03G 15/6582* (2013.01)

(58) Field of Classification Search
CPC .... G03G 15/5062; G03G 15/01; G03G 15/55; G03G 15/6529; G03G 15/6573; G03G 2215/00421; G03G 15/6538; G03G 15/6564; G03G 15/6582; G06T 7/0002; H04N 1/00002; H04N 1/00015; H04N 1/00082; H04N 1/00652; H04N 1/0062
See application file for complete search history.

(56) References Cited

U.S. PATENT DOCUMENTS

| | | | |
|---|---|---|---|
| 6,292,635 B1 | 9/2001 | Tokairin et al. | |
| 8,953,179 B2 | 2/2015 | Sawano | |
| 9,235,790 B2 * | 1/2016 | Hiramatsu | G03G 15/5062 |
| 2018/0130192 A1 * | 5/2018 | Yago | G03G 15/5062 |

FOREIGN PATENT DOCUMENTS

| | | |
|---|---|---|
| JP | 2001018476 A | 1/2001 |
| JP | 2007043489 A | 2/2007 |
| JP | 2012039424 A | 2/2012 |

* cited by examiner

*Primary Examiner* — Sophia S Chen
(74) *Attorney, Agent, or Firm* — Holtz, Holtz & Volek PC

(57) ABSTRACT

An image forming device includes: an image forming part that forms an image on a transfer medium; a conveyance part that conveys the transfer medium; and a hardware processor that controls the conveyance part, receives a result of reading by an image reader, which reads an image on the transfer medium passing through the image forming part, and determines whether an image on the transfer medium is normal, wherein the hardware processor can perform control of sorting, by a sorting part that can perform sorting of a transfer medium according to a result of the determination, a transfer medium determined to have a normal image and a transfer medium determined to have an abnormal image, and can further perform control of previously grasping analysis time in the determination and suspending conveyance of the transfer medium at a conveyance position at or in advance of a sorting position.

17 Claims, 15 Drawing Sheets

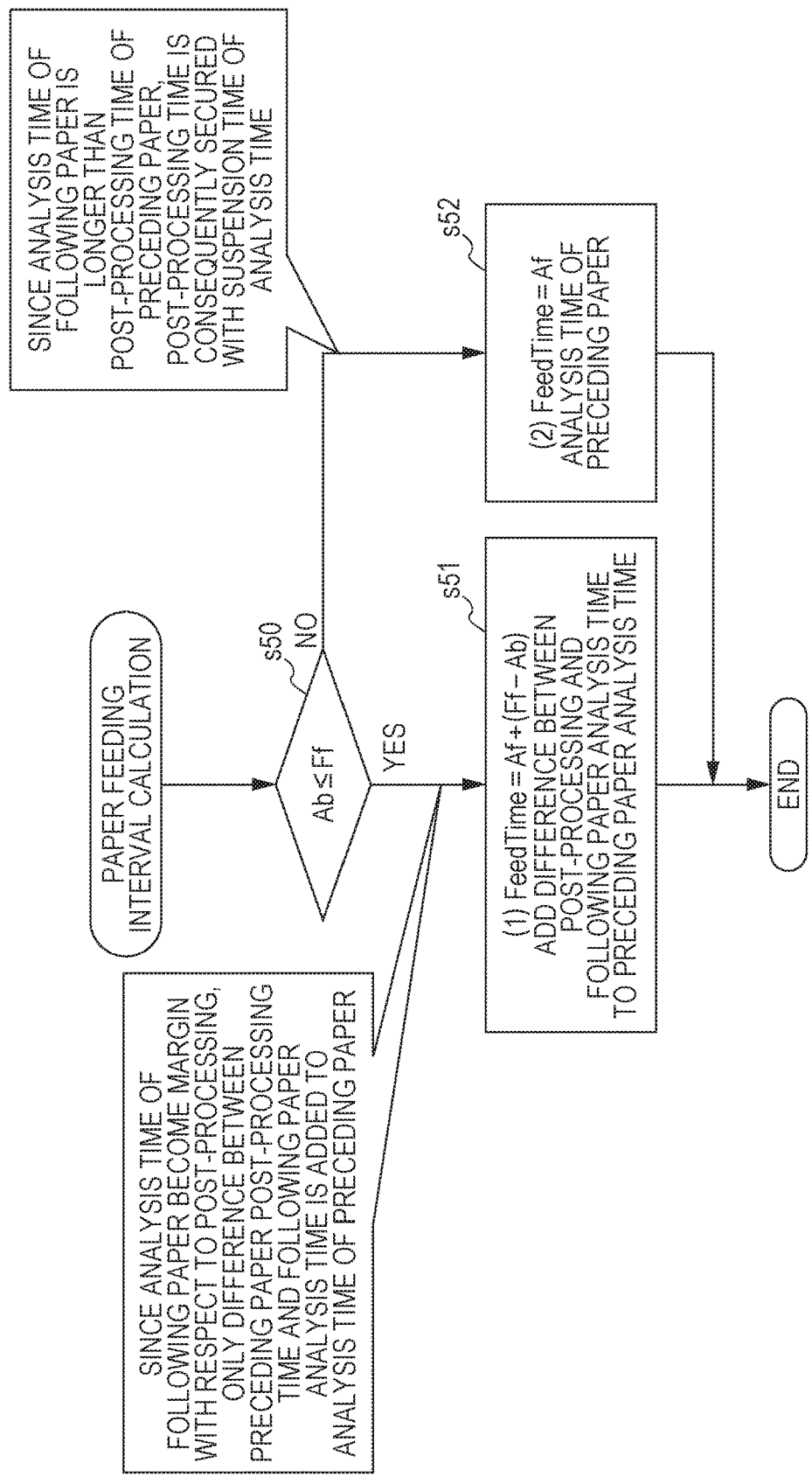

IMAGE FORMING DEVICE, TRANSFER MEDIUM CONVEYANCE DEVICE, IMAGE FORMING SYSTEM, AND PROGRAM

The entire disclosure of Japanese patent Application No. 2017-086179, filed on Apr. 25, 2017, is incorporated herein by reference in its entirety.

BACKGROUND

Technological Field

The present invention relates to an image forming device, a transfer medium conveyance device, an image forming system, and a program that determine, according to a result of reading an image on a transfer medium, whether the image is normal and that perform sorting of the transfer medium according to a result of the determination.

Description of the Related Art

In a field of an image forming device such as a copier, a printer, or a multi-function printer, abnormality of an image or an image quality adjustment is determined by utilization of image read data acquired by reading of an image on paper. For example, a device that compares a read image with image data for printing or a read image determined to be normal, that determines that the read image is normal in a case where the images are coincident, and that determines that the read image is abnormal in a case where the images are not coincident has been proposed (see, for example, JP 2007-43489 A, JP 2001-18476 A, and JP 2012-39424 A). In a case where it is determined that the image is abnormal, paper is determined to be a waste. Processing of ejecting waste paper to an ejection destination different from an ordinary paper ejection destination, or the like is performed.

Incidentally, necessary time for analysis varies depending on an examination item, an examination object (size or image), and examination accuracy of a waste paper examination. Thus, there is a problem that sorting of waste paper to an ejection destination becomes unsuccessful when printing is performed at a certain paper interval and that the waste paper and normal paper are loaded in the same tray although examination is performed. Furthermore, there is a problem that optimal print productivity cannot be secured when a uniform paper interval is set to avoid this according to an examination item.

In JP 2007-43489 A, in order to efficiently detect a defect of an image formed on a recording medium, an image setting mode and a post-processing mode are determined from information received along with image data, an examination region where examination is necessary is determined according to the determined mode, and only the examination region is examined so that examination time is reduced. An examined range is limited to deal with a problem of long examination time. However, omission of examination, or the like may be generated since an examination region is limited.

In JP 2001-18476 A, for accurate printing and checking, a reading device in a state of printing continuous paper is stopped until a reading operation is over. However, it is not possible to correspond to control of switching a paper ejection destination in a case where paper is determined to be waste paper.

In JP 2012-39424 A, control of changing a conveyance speed according to an examination item is performed. However, control contents become complicated, and it is not possible to deal with a case where analysis time varies due to complexity of image data to be examined, or the like.

SUMMARY

The present invention has been made in view of the forgoing, and an object thereof is to provide an image forming device, a transfer medium conveyance device, an image forming system, and a program that can securely perform sorting of a transfer medium by suspending the transfer medium according to analysis time in determination whether an image on the transfer medium is normal.

To achieve the abovementioned object, according to an aspect of the present invention, an image forming device reflecting one aspect of the present invention comprises:

an image forming part that forms an image on a transfer medium;

a conveyance part that conveys the transfer medium; and a hardware processor that controls the conveyance part, receives a result of reading by an image reader, which reads an image on the transfer medium passing through the image forming part, and determines whether an image on the transfer medium is normal, wherein the hardware processor can perform control of sorting, by a sorting part that can perform sorting of a transfer medium according to a result of the determination, a transfer medium determined to have a normal image and a transfer medium determined to have an abnormal image, and can further perform control of previously grasping analysis time in the determination and suspending conveyance of the transfer medium at a conveyance position at or in advance of a sorting position according to the analysis time.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 15 is a flowchart illustrating a procedure of calculating a paper feeding interval.

DETAILED DESCRIPTION OF EMBODIMENTS

Figure 1:
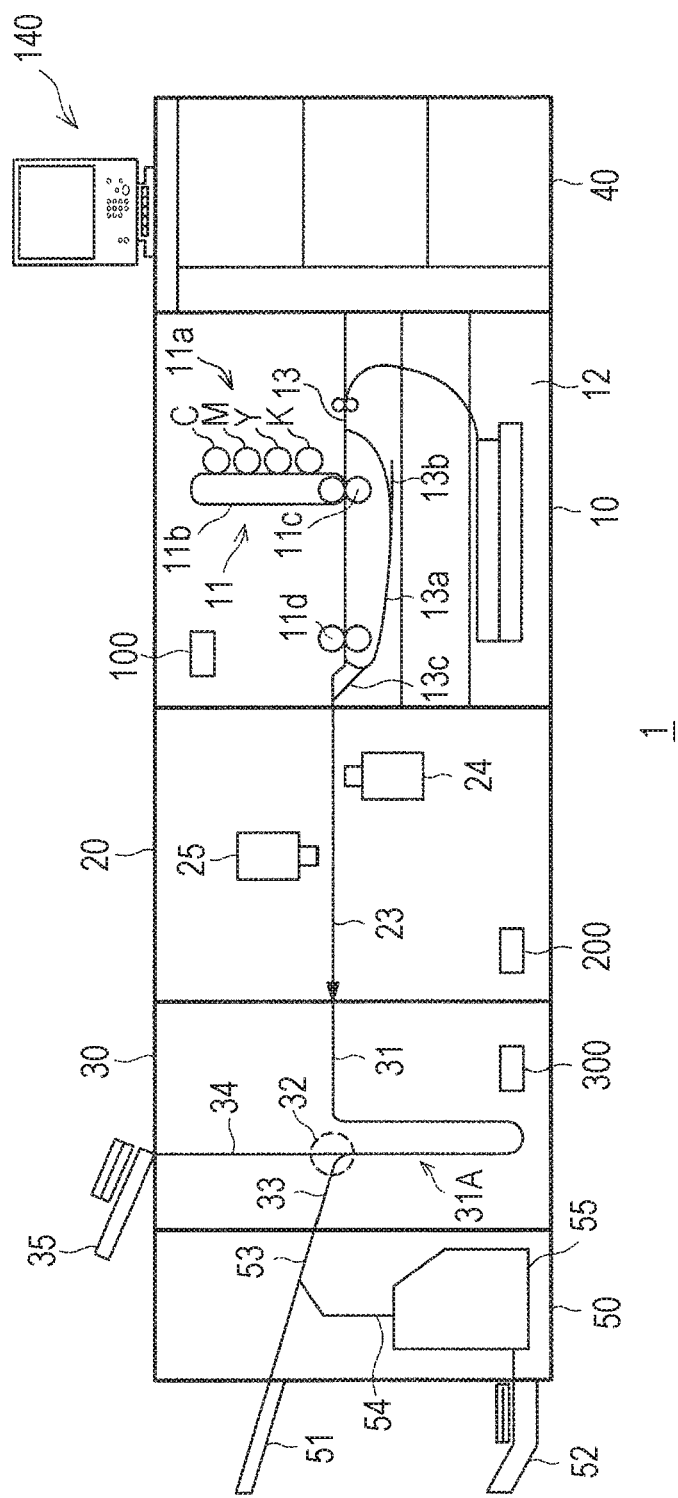
FIG. 1 is a view illustrating a mechanical outline of an image forming device of an embodiment of the present invention.

Hereinafter, an image forming device according to one or more embodiments of the present invention will be described with reference to the drawings. However, the scope of the invention is not limited to the disclosed embodiments.

An image forming device 1 includes a device main body 10, a paper feeding device 40 connected to a front stage side of the device main body 10, and an image reading device 20, a sorting device 30, and a post-processing device 50 that are serially connected to a rear stage side of the device main body 10. Note that in this embodiment, a description is made on the assumption that the image forming device includes these devices. However, an image forming device may include a device main body 10, or an image forming system may include an image forming device and a different device. Furthermore, in an image forming system, an image reading device may be included in an image forming device, and a sorting device may be further included in the image forming device.

The paper feeding device 40 houses paper and feeds the paper to the device main body 10. A large amount of paper can be housed. Paper corresponds to a transfer medium of the present invention. Note that a transfer medium is not limited to paper and may be cloth or plastic.

An operation part 140 is included on an upper side of the paper feeding device 40. The operation part 140 can include a touch-panel LCD and operation by an operator and displaying of information can be performed thereon. The LCD functions as both of an operation part and a display and functions as an operation display part. Note that an operation part may include a mouse or a tablet and may be configured separately from a display. An operation display part includes these configurations. Furthermore, an LCD may be portable.

Next, the device main body 10 will be described.

A main-body paper feeding part 12 including a plurality of paper feeding stages is arranged on a lower side of the device main body 10. Paper is housed in the main-body paper feeding part 12, and the paper is fed to a conveyance path 13 of the device main body 10. Paper is also housed in the paper feeding device 40 in a front stage of the device main body 10, and the paper can be also fed from the paper feeding device 40. The conveyance path 13 that conveys paper is provided in the device main body 10. The conveyance path 13 conveys paper fed from the main-body paper feeding part 12 or the paper feeding device 40. An image forming part 11 is provided in the middle of the conveyance path 13 in the device main body 10. The image forming part 11 includes a photoreceptor 11a for each color (cyan (C), magenta (M), yellow (Y), and black (K)) and includes a charger, an LD, and a developing device (not illustrated) around each photoreceptor 11a. Moreover, the image forming part 11 includes an intermediate transfer belt 11b, a secondary transfer part 11c, and a fixing device 11d. An image on each photoreceptor 11a is transferred onto the intermediate transfer belt 11b, and the secondary transfer part 11c transfers the image on the intermediate transfer belt 11b onto paper. The fixing device 11d is arranged in the conveyance path 13 on a downstream side of the secondary transfer part 11c, and fixes the image on the paper by applying heat or pressure to the paper.

As described, the image forming part 11 includes the photoreceptor 11a, the charger (not illustrated), the LD (not illustrated), the developing device (not illustrated), the intermediate transfer belt 11b, the secondary transfer part 11c, the fixing device 11d, and the like. Note that a color printer is assumed in the present embodiment. However, the present invention is not limited to this and may be an image forming device that can perform printing only in a single color such as a monochrome.

A reverse conveyance path 13a branches from the conveyance path 13 on a downstream side of the fixing device 11d. A downstream conveyance path 13c branches from the reverse conveyance path 13a, and a retraction conveyance path 13b branches from the reverse conveyance path 13a on a downstream side thereof. The reverse conveyance path 13a joins the conveyance path 13 on an upstream side of the image forming part 11 at or behind a branch point of the retraction conveyance path 13b. The downstream conveyance path 13c joins the conveyance path 13 on a downstream side in a conveyance direction.

In a case where only switching of a facing surface of paper is performed, paper conveyed to the reverse conveyance path 13a is conveyed backward to the downstream conveyance path 13c after temporarily conveyed to the retraction conveyance path 13b. The paper conveyed to the downstream conveyance path 13c is conveyed to the conveyance path 13, in a state in which switching of a facing surface is performed, and conveyed to a downstream side.

In a case where paper is reversed and image forming onto a rear surface is performed, after the paper is temporarily conveyed from the reverse conveyance path 13a to the retraction conveyance path 13b, the paper is conveyed backward to the reverse conveyance path 13a on the downstream side and is made to join the conveyance path 13 on the upstream side of the image forming part 11. Subsequently, image forming onto a rear surface side of the paper is performed. A downstream side of the conveyance path 13 is connected to a conveyance path 23 of the image reading device 20.

The device main body 10 includes a controller 100. The controller 100 controls the whole image forming device and can include a CPU, a program executed by the CPU, storage storing a parameter or a work area, and the like. The controller 100 can receive a result of reading in the image reading device 20 described later.

The controller 100 can determine whether an image is normal or abnormal in the result of reading. The sorting device 30 performs sorting of paper on the basis of normality or abnormality of the image. In this embodiment, a different conveyance destination is selected in the sorting. Furthermore, with respect to determination, analysis time necessary for the determination is previously calculated according to an examination item, an examination object (size or image), examination accuracy, and the like of a waste paper examination. Analysis time may be calculated for each page according to image data before printing, contents of examination, and the like. Furthermore, analysis time may be recorded for each page in a sample output or the like. The analysis time for each page is stored in the storage. The controller 100 sets time for suspending paper before sorting, or a paper feeding interval on the basis of this analysis time. The paper feeding interval corresponds to a feeding interval of the present invention.

Next, the image reading device 20 will be described.

The image reading device 20 provided on a paper ejection side of the device main body 10 includes the conveyance path 23 inside. An upstream side of the conveyance path 23 is connected to the conveyance path 13 of the device main body 10, and a downstream side thereof is connected to a conveyance path of the sorting device 30.

An image reader 24 and an image reader 25 each of which reads an image on one surface of paper are included in this order in the middle of the conveyance path 23. The image reader 24 reads an image on a lower surface of paper conveyed in the conveyance path 23, and the image reader 25 reads an image on an upper surface of the paper conveyed in the conveyance path 23. A result of reading by the image readers 24 and 25 is transmitted to the controller 100. For example, each of the image readers 24 and 25 may be a line sensor including a CMOS sensor or a CCD sensor, or may be a colormeter that reads an image by a point.

Note that in this embodiment, what includes two image readers has been described. However, the number of image readers is not limited, and the number thereof may be one, or three or larger in the present invention. A plurality of image readers may be of different kinds.

By controlling the image readers 24 and 25, a reading controller 200 included in the image reading device 20 can receive a result of reading by the image readers 24 and 25, and can temporarily store this into an image memory or transmit this to the controller 100.

Note that in this embodiment, determination of normality or abnormality of an image is performed in the controller 100. However, determination of an image may be performed in the image reading device 20. In this case, images read by the image readers 24 and 25 can be acquired by the reading controller 200, and determination can be performed in the reading controller 200.

Usually, image data that becomes a reference in determination of normality or abnormality may be acquired from RIP data by the controller 100 and transmitted to the reading controller 200, or a result of reading which result is output by a sample output or the like may be stored into an image memory or the like of the image reading device 20 and used as reference data. In a case of being used in the controller 100, reference data may be transmitted to the controller 100, stored in an image memory or the like, and managed by the controller 100.

The controller 100 or the reading controller 200 can determine whether an image is normal or abnormal by comparing reference data and image data read by the image reader. For example, it is possible to determine that the image is normal when the two are coincident with each other, and to determine that the image is abnormal when the two are not coincident with each other. A reference for determining normality or abnormality can be arbitrarily set.

The sorting device 30 is connected to a paper ejection side of the image reading device 20, and includes a conveyance path 31 connected to the image reading device 20. The conveyance path 31 includes a sorting part 32 that switches a paper ejection destination. A downstream side of the sorting part 32 branches to a conveyance path 33 and a conveyance path 34.

A leading end side of the conveyance path 34 is connected to a purge tray 35 provided in the sorting device 30. A leading end side of the conveyance path 33 is connected to the post-processing device 50.

The sorting part 32 controls a conveyance destination through a conveyance controller 300 under control by the controller 100. In a case where it is determined that an image is normal as a result of determination by the controller 100, paper is conveyed to the post-processing device 50 through the conveyance path 33 via a sorting position. In a case where it is determined that an image is abnormal as a result of the determination, paper is ejected to the purge tray 35 through the conveyance path 34 via the sorting position.

Furthermore, in the conveyance path 31, a suspension part 31A that suspends conveyance of paper is provided. The paper is suspended in the suspension part 31A for suspension time set by control by the controller 100. When the set suspension time passes or when an instruction of performing conveyance again is given on the assumption that analysis in the controller 100 is over, the conveyance is resumed and sorting is performed when necessary. Note that a position of a suspension part only needs to be at or in advance of a sorting position and is set at a position where sorting can be performed after the conveyance is resumed. For example, a suspension position is set in such a manner as not to be a position where a sorting position is too close and sorting cannot be performed after the conveyance is resumed. Note that a suspension position can be variable.

Note that in this embodiment, analysis of an image, suspension, and sorting are performed in the controller 100. However, an image reading device and a sorting device may perform these operations as an integral conveyance device. In that case, by a reading controller and a sorting controller provided in the image reading device or the sorting device, determination of normality or abnormality may be performed with respect to an image read by an image reader, and suspension control and sorting may be performed on the basis of a result of the determination. The reading controller and the sorting controller that perform these kinds of control correspond to a conveyance controller of the present invention.

The post-processing device 50 includes a conveyance path 53. An upstream side of the conveyance path 53 is connected to the conveyance path 33 of the sorting device 30. The post-processing device 50 includes a plurality of trays that is a first paper output tray 51 and a second paper output tray 52 as paper ejection destinations.

A post-processing conveyance path 54 branches in the middle of the conveyance path 53. The post-processing conveyance path 54 is connected to the post-processing part 55. A downstream side of the conveyance path 53 is connected to the first paper output tray 51.

The post-processing part 55 performs predetermined processing such as stapling, punching, and saddle stitching and may perform a plurality of kinds of post-processing. Paper passing through the post-processing part 55 is ejected to the second paper output tray 52.

In a case where post-processing is not performed in the post-processing device 50, paper is conveyed straight in the conveyance path 53 and ejected to the first paper output tray 51. In a case where post-processing is performed, paper is conveyed from the conveyance path 53 to the post-processing conveyance path 54, predetermined post-processing is performed thereon in the post-processing part 55, and the paper is ejected to the second paper output tray 52.

Figure 2:
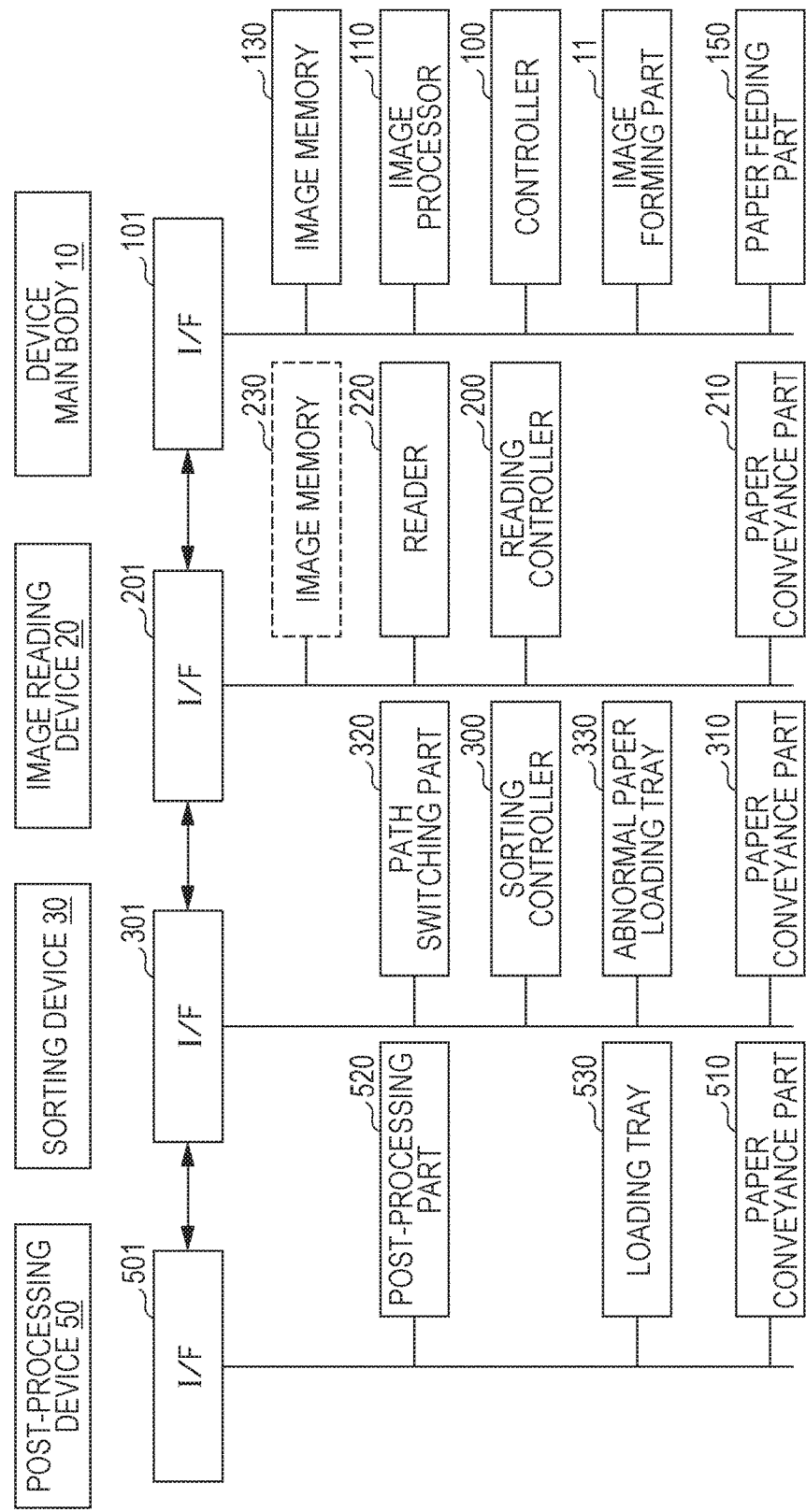
FIG. 2 is a block diagram illustrating an electric configuration of the same.

Next, a control block of the image forming device 1 is illustrated in FIG. 2.

The device main body 10 includes an interface 101 that performs communication with a connected device, and connection to an interface of the image reading device 20 is made in the device main body 10.

The device main body 10 includes the controller 100 that controls the whole image forming device 10, and an image processor 110 is connected to the controller 100. The image processor 110 performs image processing such as reading of image data or writing of an image.

The image forming part 11 is controllably connected to the controller 100, and can form an image onto paper on the basis of read image data, RIP data, or the like.

The image data can be temporarily stored into an image memory 130 and used for image forming.

A paper feeding part 150 feeds paper to the image forming part 11, and includes the paper feeding device 40 and the main-body paper feeding part 12.

The image reading device 20 includes an interface 201 that communicates with the interface 101 of the device main body 10 and that further communicates with an interface of the sorting device 30 in a rear stage.

The image reading device 20 includes the reading controller 200 that controls the image reading device 20. An operation of the image reading device 20 can be controlled by a control command from the controller 100. The reading controller 200 includes a CPU, a program that operates on the CPU, storage, and the like.

Furthermore, in a case where normality or abnormality of an image read in the image reading device 20 is determined, the determination can be performed in the reading controller 200.

A paper conveyance part 210 is controllably connected to the reading controller 200. The paper conveyance part 210 conveys paper conveyed from the device main body 10 in such a manner that an image thereon can be read, and further conveys the paper to a rear stage.

A reader 220 is controllably connected to the reading controller 200. The reader 220 includes the image readers 24 and 25. A result of reading by the reader 220 is temporarily transmitted to the reading controller 200, and is transmitted to the controller 100 in such a manner that determination can be performed directly or determination can be performed in the controller 100.

An image memory 230 is further connected to the reading controller 200 controllably. The image memory 230 stores a result of reading by the reader 220. Note that no image memory 230 may be provided in the image reading device 20, and a result of reading may be stored in an image memory provided in the device main body 10.

The sorting device 30 includes an interface 301 that communicates with the interface 201 of the image reading device 20 and that further communicates with an interface of the post-processing device 50 in the rear stage.

The sorting device 30 includes the sorting controller 300 that controls the whole sorting device 30. The sorting controller 300 includes a CPU, a program that operates on the CPU, storage, and the like.

A paper conveyance part 310 is controllably connected to the sorting controller 300. The paper conveyance part 310 conveys paper, which is conveyed from the image reading device 20, in a sortable manner and conveys the paper to a purge tray or a rear stage. Furthermore, the paper conveyance part 310 can operate in such a manner that paper is suspended in the conveyance path.

A path switching part 320 is controllably connected to the sorting controller 300. The path switching part 320 includes the sorting part 32 and performs switching of a conveyance destination of paper. Switching of a path is controlled via the sorting controller 300 in a case where control is performed by the controller 100. In a case where sorting is performed in the sorting controller 300, a conveyance destination is switched by a command from the sorting controller 300. In this case, the sorting controller 300 corresponds to a conveyance controller of the present invention.

Note that in this embodiment, sorting of paper is performed by switching of a conveyance destination. However, this is not the limitation and it is only necessary that sorted sheets of paper can be distinguished from each other. For example, sorting can be also performed by shift paper ejection or paper ejection with changing of a rotational direction.

An abnormal paper loading tray 330 is provided in the conveyance controller 300. The purge tray 35 is included in the abnormal paper loading tray 330, and corresponds to a paper ejection destination to which sorted paper determined to be abnormal in determination of an image is ejected.

An interface 501 that communicates with the interface 301 of the sorting device 30 is provided in the post-processing device 50.

A paper conveyance part 510 is provided in the post-processing device 50. The paper conveyance part 510 conveys paper conveyed from the sorting device 30, performs post-processing, and ejects the paper. Furthermore, paper may be ejected without post-processing depending on a post-processing setting.

A post-processing part 520 is provided in the post-processing device 50. Desired post-processing is performed in the post-processing part 520. There may be one, or two or more kinds of post-processing.

A loading tray 530 is provided in the post-processing device 50. The loading tray 530 includes the first paper output tray 51 and the second paper output tray 52.

Next, an operation of performing suspension immediately before sorting according to analysis time for determination will be described. Note that in any of the following operations, a post-processing operation is performed in a normal paper ejection destination. Note that in the following description, a time point at which paper reaches a suspension position is a starting point of analysis time. However, analysis may be started before the suspension position.

Figure 3:
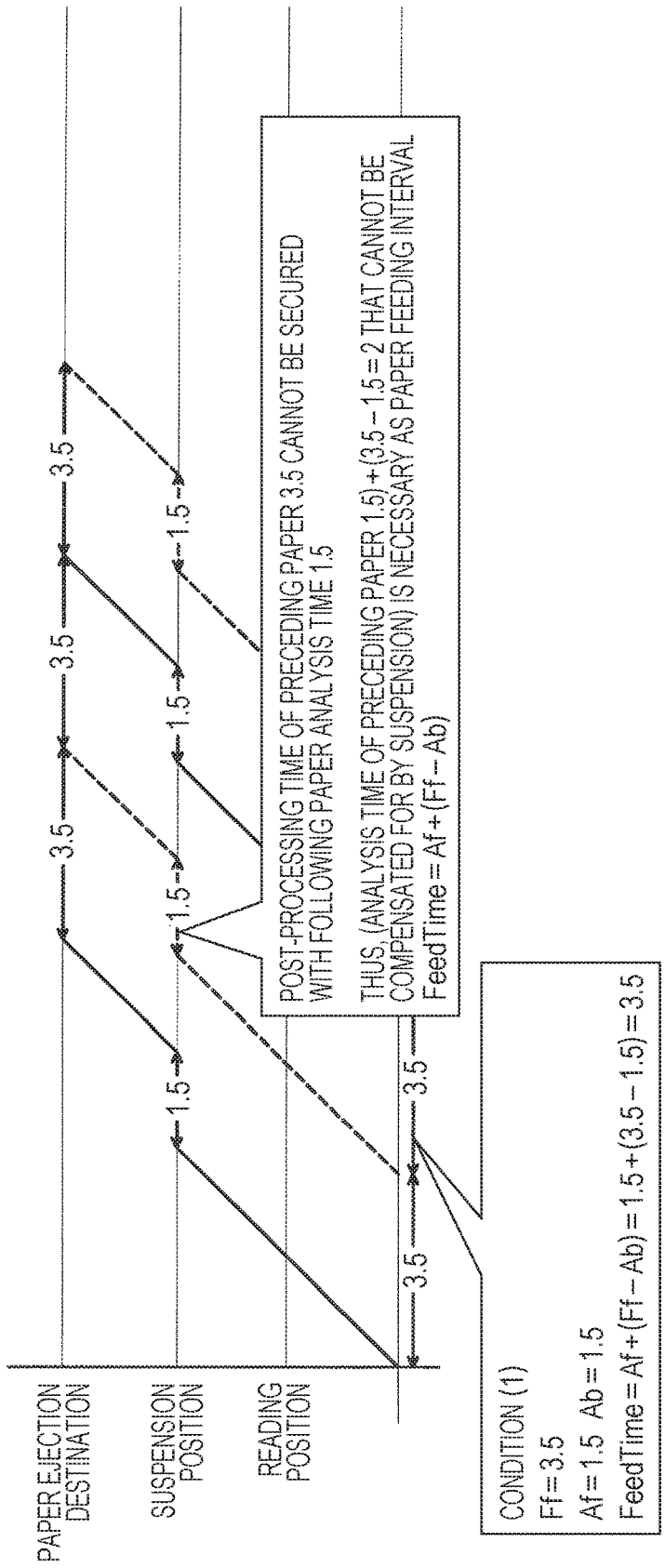
FIG. 3 is a view for describing analysis time of preceding paper, analysis time of following paper, suspension time set according to post-processing time, and a paper feeding interval of the same.

First, a condition 1 will be described with reference to FIG. 3. In the condition 1, it is assumed that analysis time Af until analysis of preceding paper is over (the same shall apply hereinafter) is 1.5, analysis time of following paper Ab is 1.5, and post-processing time Ff is 3.5. Note that these are indicated as a relative ratio and may be indicated, for example, by seconds (the same shall apply hereinafter). Suspension time of paper is equal to analysis time. However, analysis time and suspension time are not necessarily equal in the present invention.

Here, when suspension time is not provided, a sorting position is reached in the middle of analysis and sorting becomes difficult. In this example, suspension time is set to 1.5. Furthermore, in order to secure post-processing time, it is necessary to appropriately secure a paper feeding interval. Since the post-processing time of preceding paper is longer than the analysis time of following paper, a difference therebetween is calculated, and a value in which the analysis time of preceding paper is added to this is set to be a paper feeding interval (FeedTime=Af+(Ff−Ab)). The paper feeding interval in this case is 3.5.

Figure 4:
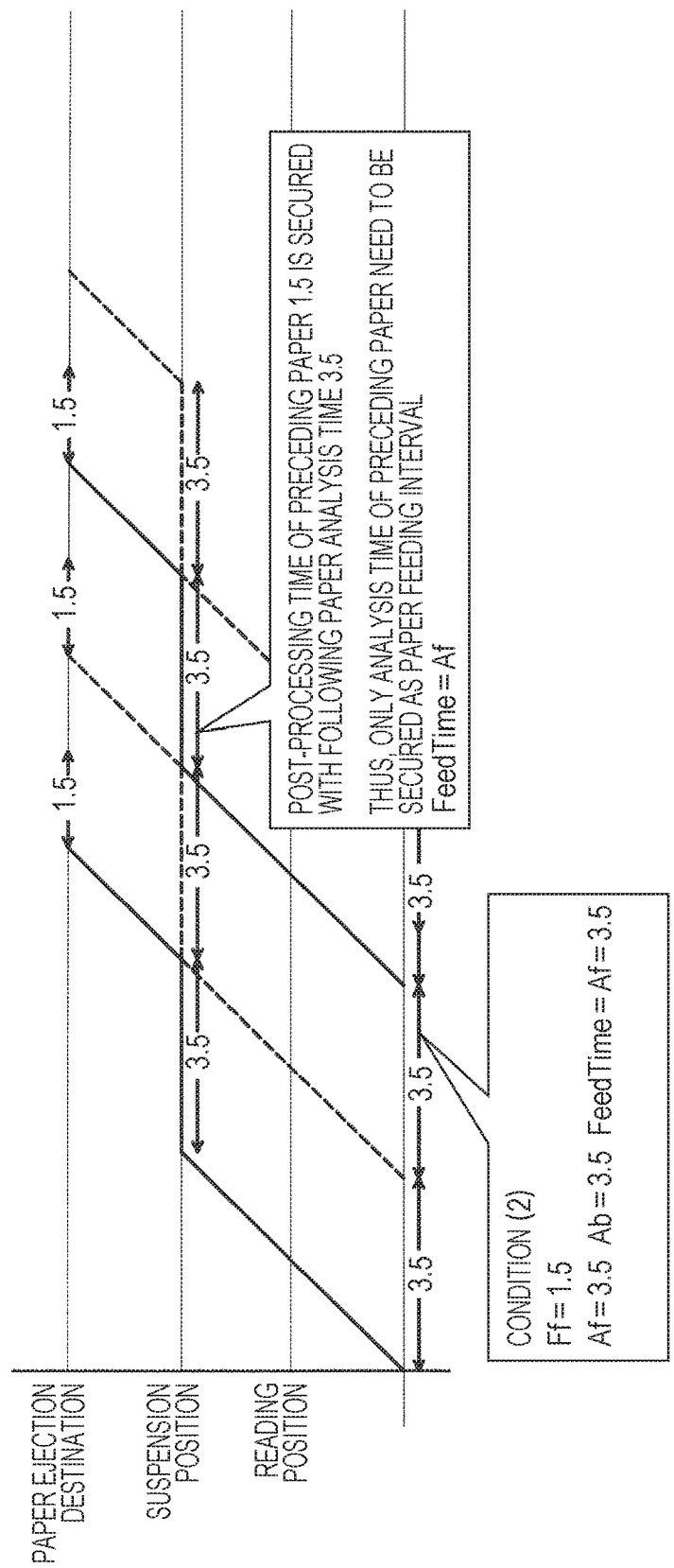
FIG. 4 is a view for describing analysis time of preceding paper, analysis time of following paper, suspension time set according to post-processing time, and a paper feeding interval in a different example.

Next, a different example will be described on the basis of FIG. 4.

In this example, it is assumed that analysis time of preceding paper Af and analysis time of following paper Ab are 3.5, and post-processing time Ff is 1.5.

When the analysis time of following paper is 3.5, 1.5 of the post-processing time is secured. Thus, as a paper feeding interval, a paper feeding interval of following paper FeedTime can be set to 3.5 that is equal to Af.

Figure 5:
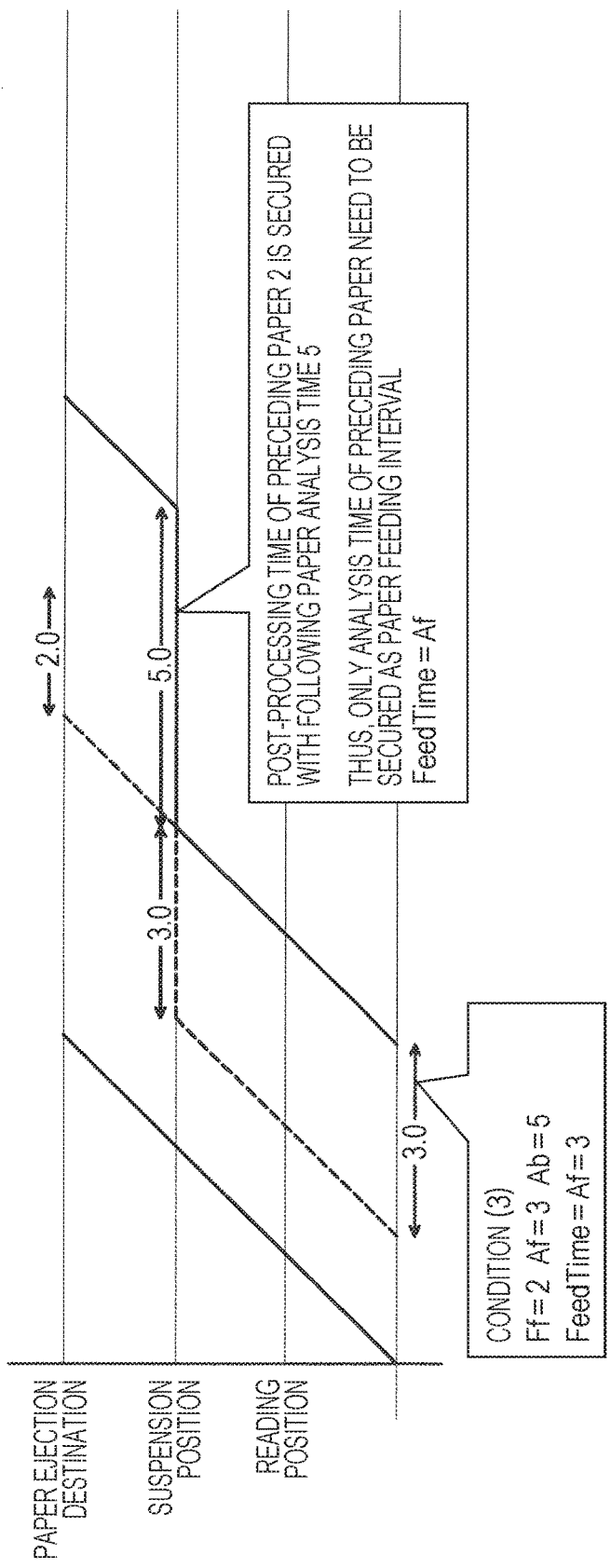
FIG. 5 is a view for describing analysis time of preceding paper, analysis time of following paper, suspension time set according to post-processing time, and a paper feeding interval in a different example.

Next, a different example will be described on the basis of FIG. 5.

In this example, analysis time of preceding paper Af is 3.0, analysis time of following paper Ab is 5.0, and post-processing time of preceding paper Ff is 2.0. When there is following paper analysis time 5.0, the post-processing time of preceding paper 2.0 is secured. Thus, as a paper feeding interval FeedTime, only the analysis time of preceding paper Af needs to be secured.

Figure 6:
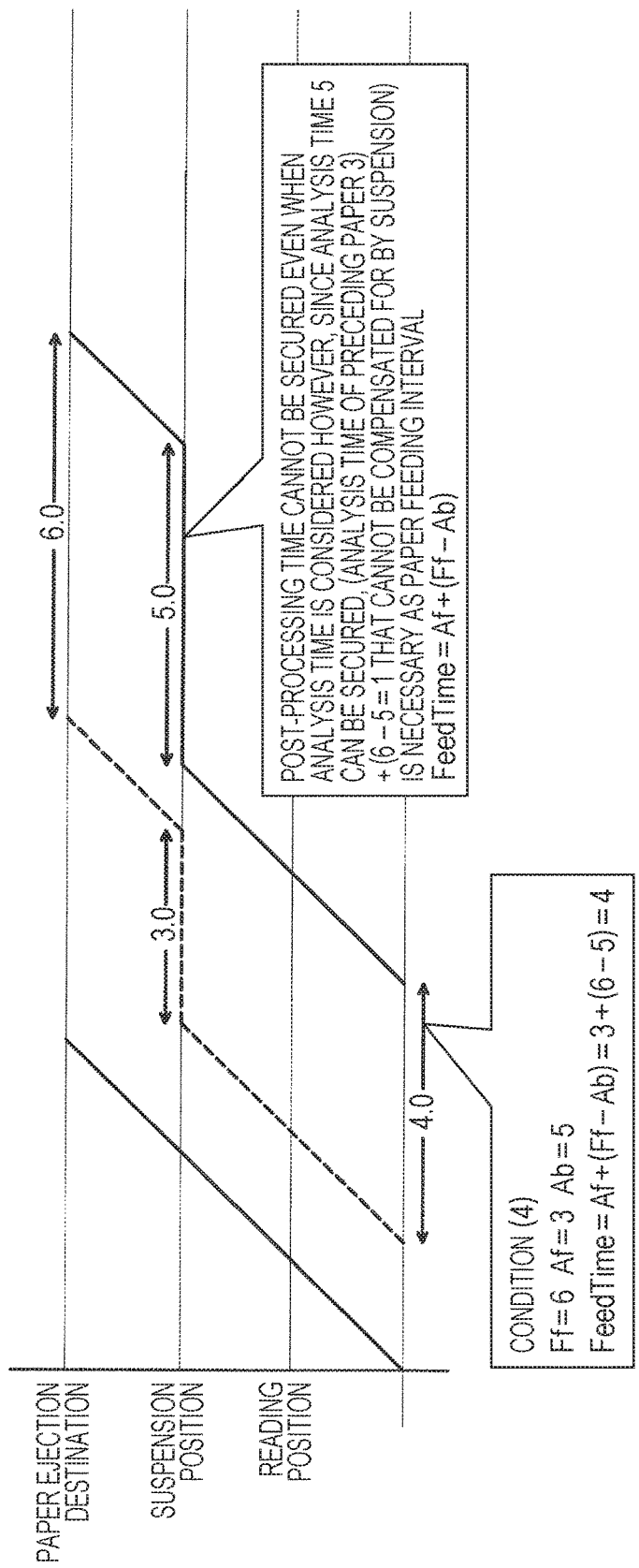
FIG. 6 is a view for describing analysis time of preceding paper, analysis time of following paper, suspension time set according to post-processing time, and a paper feeding interval in a different example.

A next example will be described on the basis of FIG. 6.

In this example, it is assumed that analysis time of preceding paper Af is 3.0, post-processing time Ff is 6.0, and analysis time of following paper Ab is 5.0. It is not possible to secure the post-processing time of preceding paper even when the analysis time of following paper is considered. However, the analysis time of following paper 5.0 can be secured. Thus, the analysis time of preceding paper Af(3.0)+time that cannot be compensated for by suspension (6−5=1) is necessary as a paper feeding interval. Thus, Af+(Ff−Ab) is necessary for a paper feeding interval FeedTime.

Figure 7:
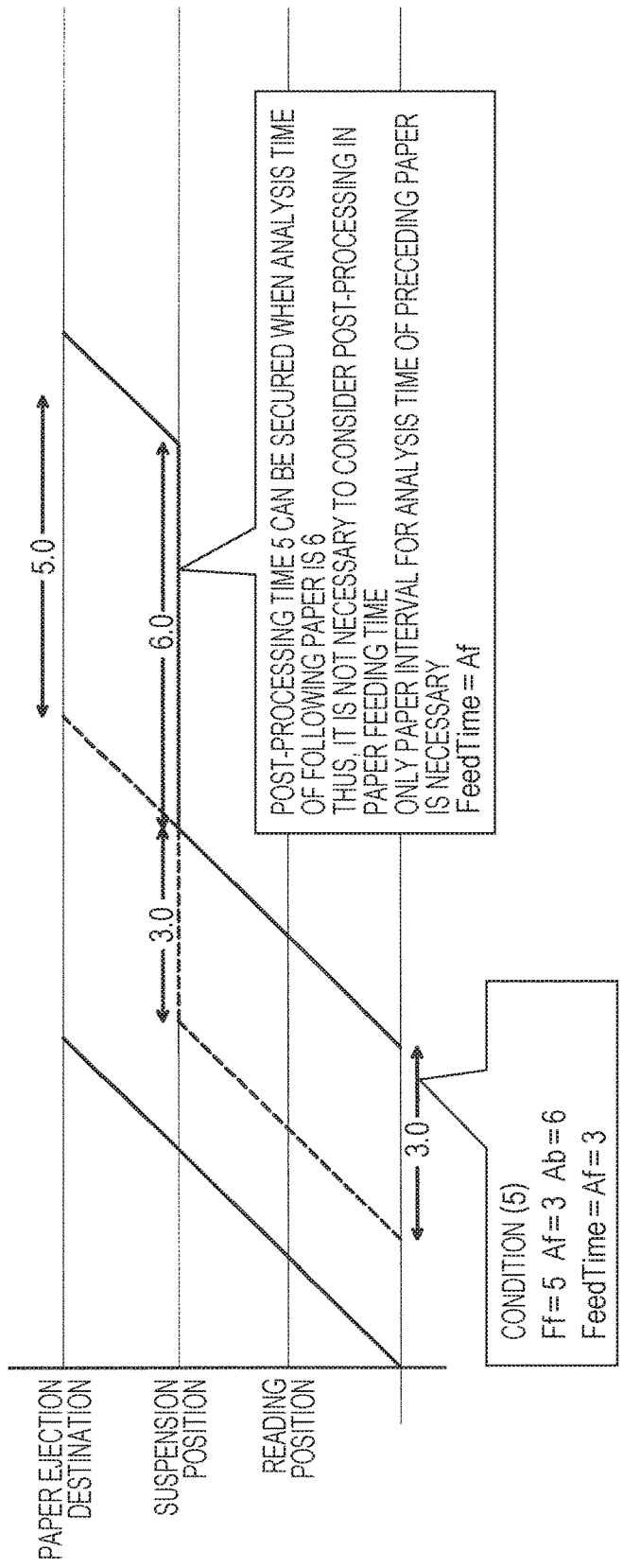
FIG. 7 is a view for describing analysis time of preceding paper, analysis time of following paper, suspension time set according to post-processing time, and a paper feeding interval in a different example.

A next example will be described on the basis of FIG. 7.

In this example, it is assumed that analysis time of preceding paper Af is 3.0, post-processing time Ff is 5.0, and analysis time of following paper Ab is 6.0. When the analysis time of following paper is 6.0, the post-processing time 5.0 can be secured. Thus, it is not necessary to consider the post-processing time in paper feeding time. A paper interval only needs to be the analysis time of preceding paper. Thus, the analysis time of preceding paper Af is enough for a paper feeding interval FeedTime.

Figure 8:
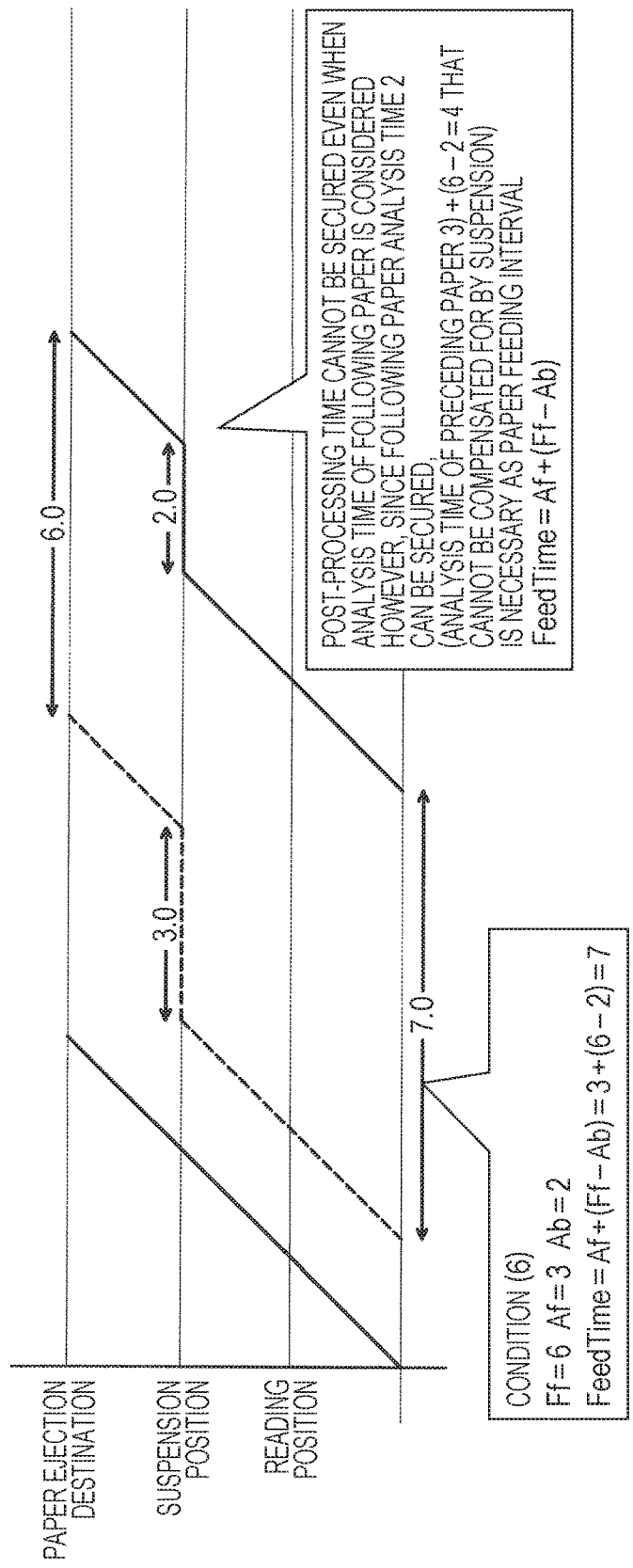
FIG. 8 is a view for describing analysis time of preceding paper, analysis time of following paper, suspension time set according to post-processing time, and a paper feeding interval in a different example.

A next example will be described on the basis of FIG. 8.

In this example, it is assumed that analysis time of preceding paper Af is 3.0, post-processing time Ff is 6.0, and analysis time of following paper Ab is 2.0. It is not possible to secure the post-processing time even when the analysis time of following paper is considered. However, it is possible to secure the following paper analysis time 2.0. Thus, the analysis time of preceding paper 3.0+time that cannot be compensated for by suspension (6−2=4) is necessary as a paper feeding interval, and a paper feeding interval FeedTime becomes Af+(Ff−Ab).

Figure 9:
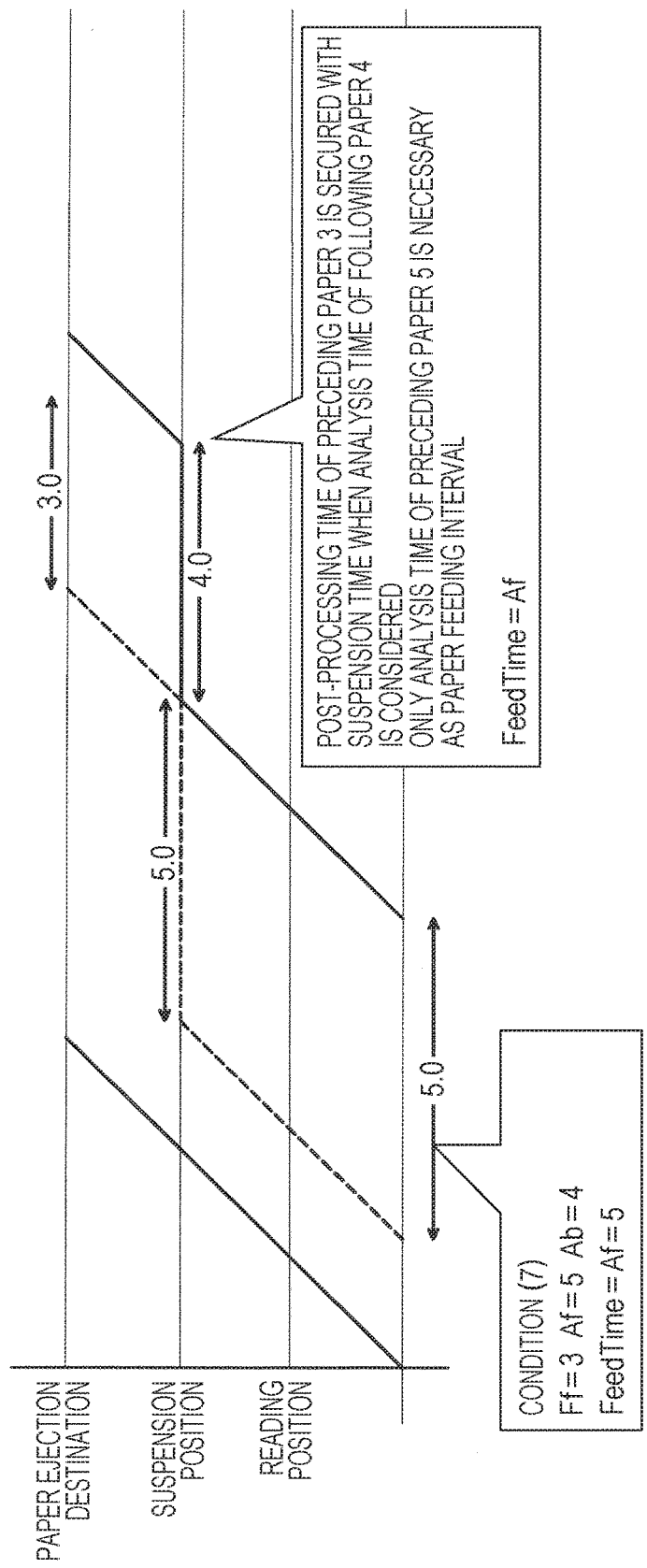
FIG. 9 is a view for describing analysis time of preceding paper, analysis time of following paper, suspension time set according to post-processing time, and a paper feeding interval in a different example.

A next example will be described on the basis of FIG. 9.

In this example, it is assumed that analysis time of preceding paper Af is 5.0, post-processing time Ff is 3.0, and analysis time of following paper Ab is 4.0. In consideration of the analysis time of following paper 4.0, the post-processing time of preceding paper 3.0 is secured by suspension time. Only the analysis time of preceding paper 5.0 is necessary as a paper feeding interval.

Figure 10:
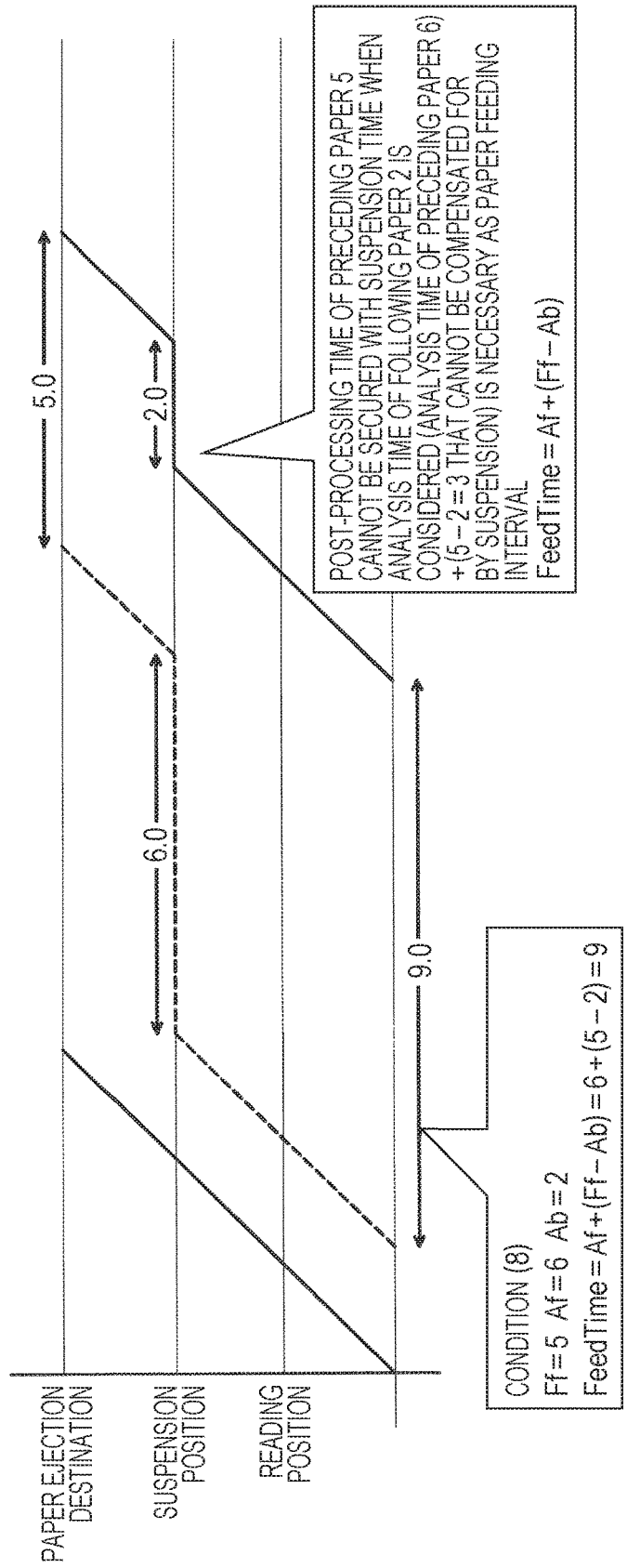
FIG. 10 is a view for describing analysis time of preceding paper, analysis time of following paper, suspension time set according to post-processing time, and a paper feeding interval in a different example.

A next example will be described on the basis of FIG. 10.

In this example, it is assumed that analysis time of preceding paper Af is 6.0, post-processing time Ff is 5.0, and analysis time of following paper Ab is 2.0. When the analysis time of following paper 2.0 is considered, the post-processing time of preceding paper 5.0 cannot be secured by suspension time. The analysis time of preceding paper 6.0 of +time that cannot be compensated for by suspension (5.0−2.0=3.0) is necessary as a paper feeding interval, and a paper feeding interval FeedTime becomes Af+(Ff−Ab).

According to the present embodiment, conveyance is suspended at a switching point at which an ejection destination is switched according to a determination result, an examination result is waited for, an ejection destination is determined according to the examination result, and the conveyance is resumed.

In a case where an ejection destination is switched according to a result of a waste paper examination, an optimal paper interval is secured and productivity is optimized according to image analysis time that varies depending on an examination item, an examination object (size or image), and examination accuracy of the waste paper examination.

In a case where the above is performed, since suspension time for analysis varies depending on image data, JAM is reached in some cases. Thus, a paper interval of following paper is determined on the basis of analysis time of preceding paper (time in which preceding paper is suspended).

Figure 11:
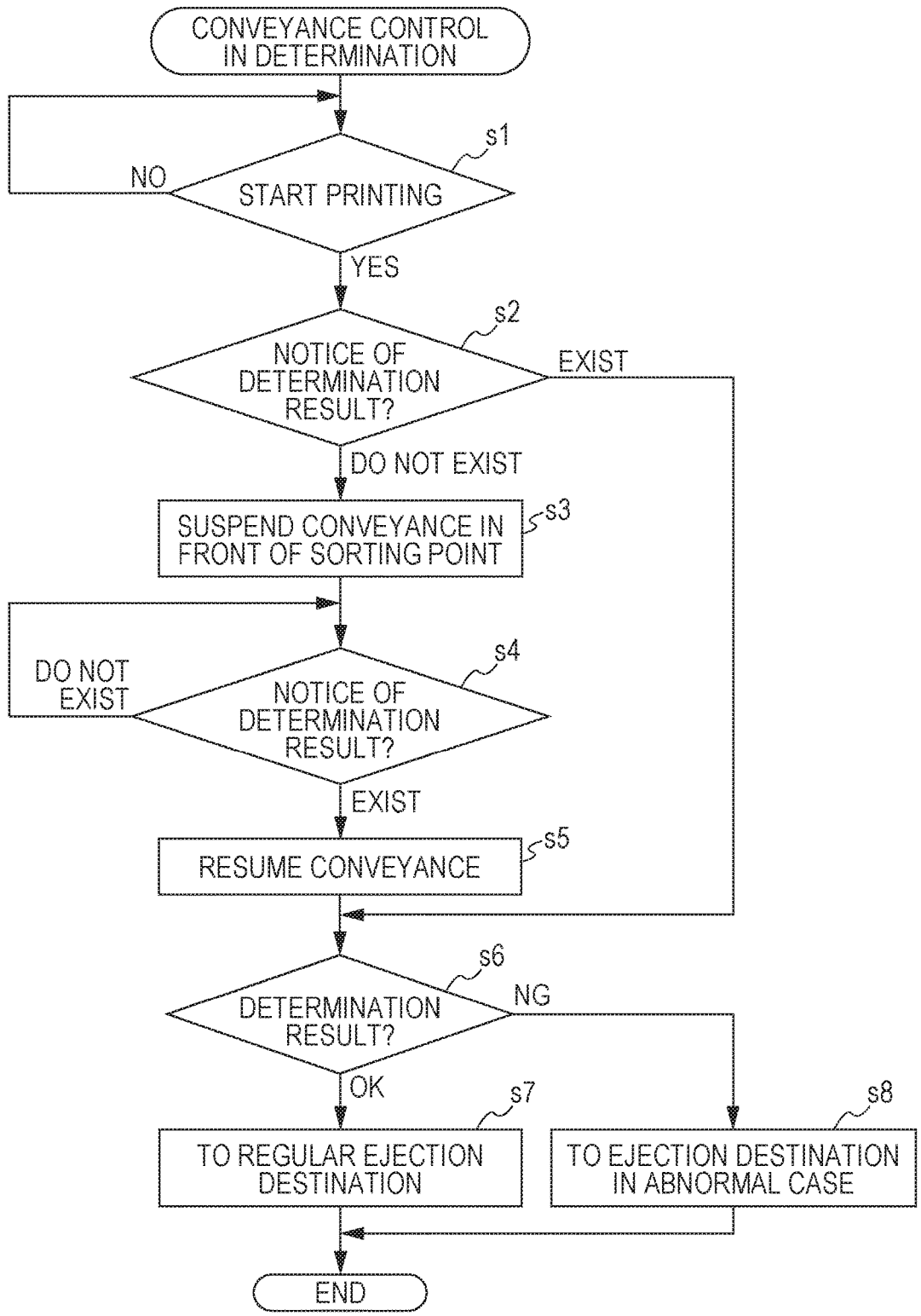
FIG. 11 is a flowchart illustrating a procedure of conveyance control in determination.

Next, control contents of a case where determination of an image is performed will be described on the basis of a flowchart in FIG. 11. Note that the following procedure is executed by control by a controller.

When the control is started, it is determined whether to start printing (step s1). When printing is not started, waiting for a start is performed (step s1, No). When printing is started (step s1, Yes), it is determined whether a notice of a determination result of an image is received (step s2). In a case where the notice of the determination result is received (step s2, Exist), the processing transitions to step s6 and is performed according to the determination result. In a case where the notice of the determination result is not received (step s2, Do not exist), conveyance is suspended in front of a sorting point (step s3), and it is waited for to receive the notice of the determination result (step s4, No).

When the notice of the determination result is received (step s4, Exist), the conveyance is resumed (step s5), and it is determined whether the determination result indicates OK (step s6). When the determination result is OK (normal), paper is ejected to a regular ejection destination (step s7), and the processing is ended. When the determination result is NG (abnormal), paper is ejected to an ejection destination in an abnormal case (step s8), and the processing is ended.

By the above procedure, it is possible to securely sort paper on the basis of a determination result of an image.

Figure 12:
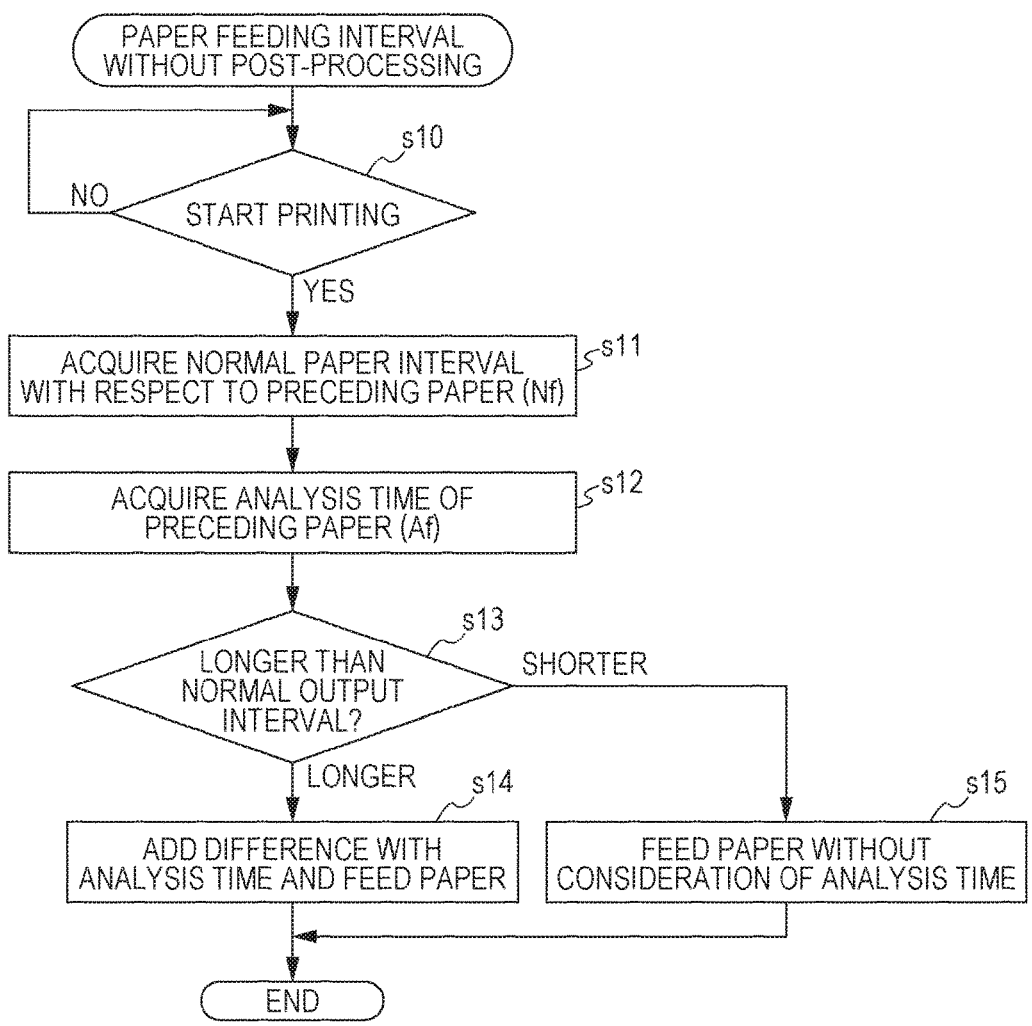
FIG. 12 is a flowchart illustrating a procedure of setting a paper feeding interval without post-processing.

Next, a procedure of determining a paper feeding interval without post-processing in a case where determination of an image is performed will be described on the basis of a flowchart in FIG. 12. Note that the following procedure is executed by control by a controller.

When the control is started, it is determined whether to start printing (step s10). When printing is not started, waiting for a start is performed (step s10, No). When printing is started (step s10, Yes), a normal paper interval of preceding paper (Nf) is acquired (step s11). Next, analysis time of preceding paper (Af) is acquired (step s12). It is determined whether the analysis time of preceding paper (At) is longer than the normal paper interval (Nf) (step s13).

In a case where the analysis time of preceding paper (Af) is longer than the normal paper interval (Nf) (step s13, longer), a difference between the analysis time and the normal paper interval is added thereto and paper is fed with this as a paper feeding interval (step s14), and the processing is ended. In a case where the analysis time of preceding paper (Af) is shorter than the normal paper interval (Nf) (step s13, shorter), paper is fed at a paper feeding interval of the normal paper interval without consideration of the analysis time (step s15), and the processing is ended.

Figure 13:
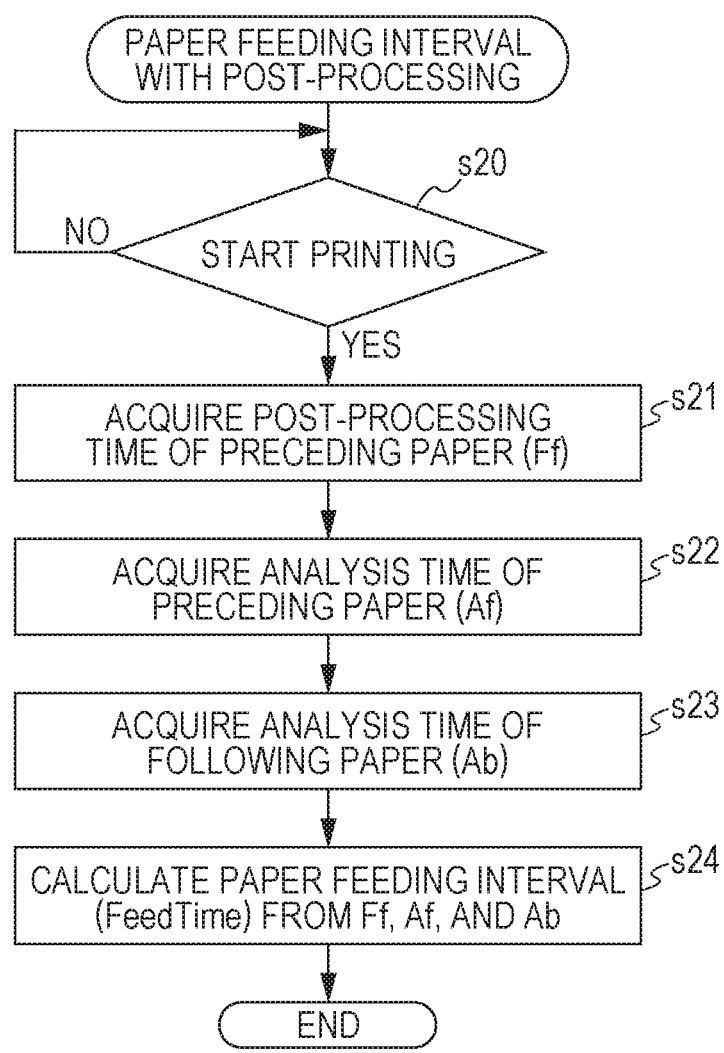
FIG. 13 is a flowchart illustrating a procedure of setting a paper feeding interval with post-processing.

Next, a procedure of determining a paper feeding interval with post-processing in a case where determination of an image is performed will be described on the basis of a flowchart in FIG. 13. The following procedure is executed by control by a controller.

When the control is started, it is determined whether to start printing (step s20). When printing is not started, waiting for a start is performed (step s20, No). When printing is started (step s20, Yes), post-processing time of preceding paper (Ff) is acquired (step s21).

Next, analysis time of preceding paper (Af) is acquired (step s22), and analysis time of following paper (Ab) is acquired (step s23). A paper feeding interval (FeedTime) is calculated from the post-processing time of preceding paper (Ff), the analysis time of preceding paper (Af), and the analysis time of following paper (Ab) (step s24), paper is fed, and the processing is ended.

Figure 14:
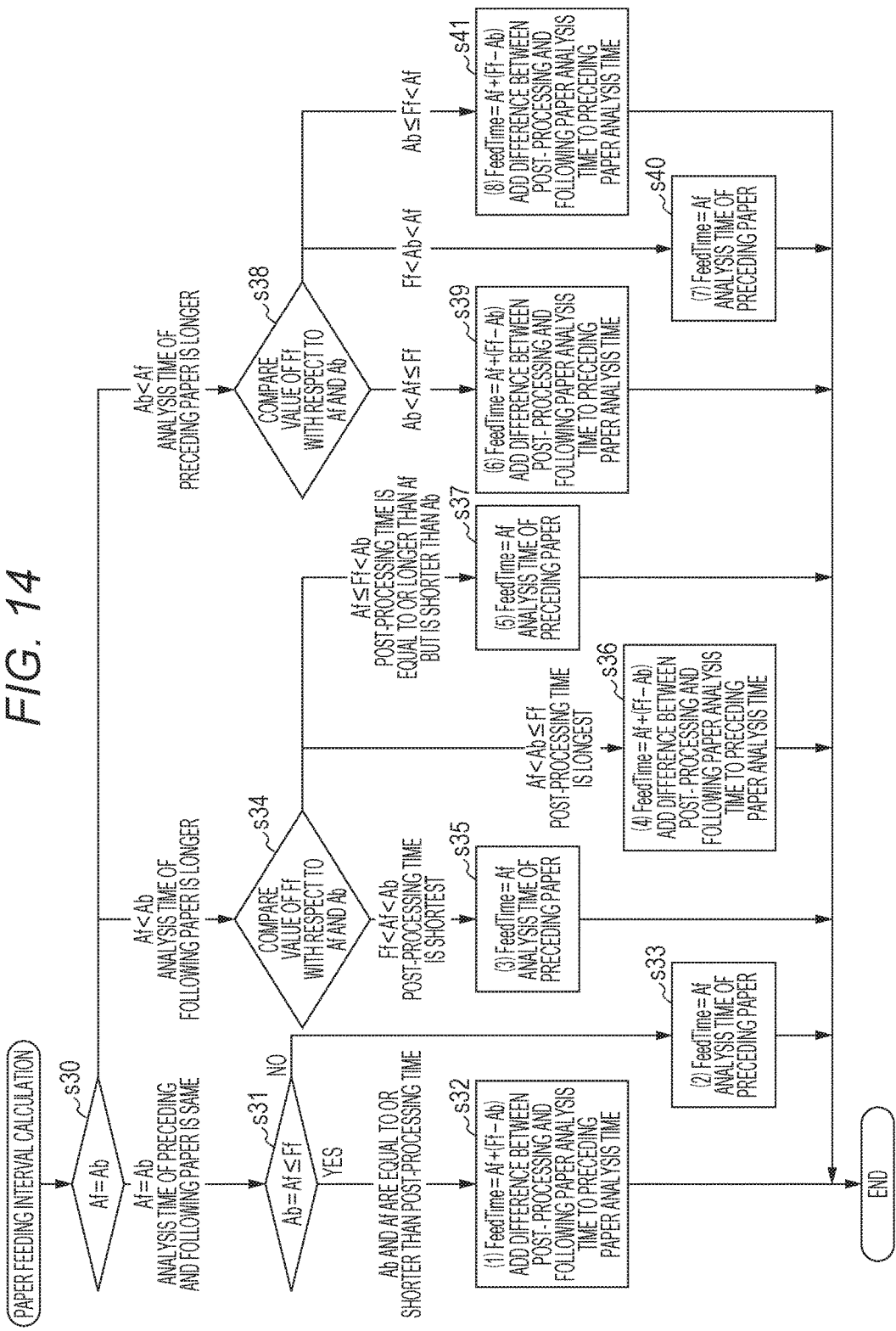
FIG. 14 is a flowchart illustrating a procedure of calculating a paper feeding interval with post-processing.

Next, a detail of the procedure of setting a paper feeding interval with post-processing will be described on the basis of a flowchart in FIG. 14. The following procedure is executed by control by a controller.

In a paper feeding interval calculation, it is determined whether analysis time of preceding paper Af and analysis time of following paper Ab are the same (step s30). In a case where the analysis time of the preceding and following paper is the same (Af=Ab) in step s30, it is determined whether the analysis time is equal to or shorter than post-processing time (Ab=Af≤Ff) (step s31). In a case where the analysis time is equal to or shorter than the post-processing time (Ab=Af≤Ff) (step s31, Yes), a difference between the post-processing time and the analysis time of following paper is added to the analysis time of preceding paper in a paper feeding interval FeedTime (FeedTime=Af+(Ff−Ab)) (step s32), and the processing is ended. In a case where the analysis time is not equal to or shorter than the post-processing time (Ab=Af≤Ff) (step s31, No), a paper feeding interval FeedTime is set to be equal to the analysis time of preceding paper (FeedTime=Af) (step s33), and the processing is ended.

In a case where Af and Ab are not equal and Af is shorter than Ab in step s30, comparison with a value of Ff is performed with respect to Af and Ab, and processing is performed according to a result of the comparison (step s34).

In a case where Ff<Af<Ab in step s34, that is, in a case where the post-processing time is the shortest, a paper feeding interval FeedTime is set to be equal to the analysis time of preceding paper (FeedTime=Af) (step s35), and the processing is subsequently ended.

In a case where Af<Ab≤Ff, that is, the post-processing time is the longest in step s34, a difference between the post-processing time and the following paper analysis time is added to the preceding paper analysis time in a paper feeding interval FeedTime (FeedTime=Af+(Ff−Ab)) (step s36), and the processing is subsequently ended.

In a case where Af≤Ff<Ab, that is, the post-processing time is equal to or longer than the preceding paper analysis time Af but is shorter than the following paper analysis time Ab in step s34, FeedTime is set to be equal to the preceding paper analysis time (FeedTime=Af) (step s37), and the processing is subsequently ended.

In a case where the analysis time of preceding paper is longer than the analysis time of following paper (Ab<Af) in step s30, a comparison with a value of Ff is performed with respect to Af and Ab, and processing is performed according to a result of the comparison (step s38).

In a case where Ab<Af≤Ff that is, the post-processing time is the longest in step s38, a difference between the post-processing time and the following paper analysis time is added to the preceding paper analysis time in a paper feeding interval FeedTime (FeedTime=Af+(Ff−Ab)) (step s39), and the processing is subsequently ended.

In a case where Ff<Ab<Af, that is, the post-processing time is the shortest in step s38, the paper feeding interval FeedTime is set to be equal to the analysis time of preceding paper (FeedTime=Af) (step s40), and the processing is subsequently ended.

In a case where Ab≤Ff<Af, that is, the post-processing time is equal to or longer than the preceding paper analysis time Ab but is shorter than the following paper analysis time Af in step s38, a difference between the post-processing time and the following paper analysis time is added to the preceding paper analysis time in FeedTime (FeedTime=Af+(Ff−Ab)) (step s41), and the processing is subsequently ended.

Next, a procedure of determining analysis time will be described on the basis of a flowchart in FIG. 15.

First, it is determined whether analysis time of following paper Ab is equal to or shorter than post-processing time Ff (step s50).

In a case where the analysis time of following paper Ab is equal to or shorter than the post-processing time Ff (step s50, Yes), only a difference between the post-processing time of preceding paper and the analysis time of following paper is added to analysis time of preceding paper since the analysis time of following paper becomes a margin with respect to post-processing. That is, a paper feeding interval FeedTime becomes Af+(Ff−Ab) (step s51).

In a case where the analysis time of following paper Ab is not equal to or shorter than the post-processing time Ff (step s50, No), since the analysis time of following paper is longer than the post-processing time, the post-processing time is consequently secured by suspension time of the analysis time. That is, the paper feeding interval FeedTime is equal to Af (step s52).

In the present embodiment, it is possible to maximize productivity of printing+a waste paper examination by performing optimal control regardless of a condition of an analysis object. Even in a case where a waste paper examination algorithm is added by addition of a new function, it is possible to perform optimization on the basis of necessary image analysis time without changing control on a paper ejection unit side. Optimization such as giving priority to productivity or giving priority to analysis accuracy can be performed according to a need of a user.

Although embodiments of the present invention have been described and illustrated in detail, the disclosed embodiments are made for purposes of illustration and example only and not limitation. The scope of the present invention should be interpreted by terms of the appended claims. The above embodiment can be arbitrarily modified within the spirit and the scope of the present invention.

What is claimed is:
1. An image forming device comprising:
an image forming part that forms an image on a transfer medium;
a conveyance part that conveys the transfer medium; and
a hardware processor configured to:

control the conveyance part,
receive a result of reading by an image reader, which reads the image on the transfer medium formed by the image forming part,
determine whether the image on the transfer medium is normal,
perform control of sorting a transfer medium determined to have a normal image and a transfer medium determined to have an abnormal image, by a sorting part that can perform sorting of a transfer medium according to a result of the determination,
obtain, before the determination, an analysis time required for the determination,
control suspending of conveyance of the transfer medium at a conveyance position at or in advance of a sorting position according to the analysis time.

2. The image forming device according to claim 1, wherein, in a case in which a transfer medium on which the determination is performed is to reach the sorting position before analysis in the determination is over, the hardware processor performs the suspension at least until the analysis in the determination is over and sorting after the conveyance is resumed becomes possible.

3. The image forming device according to claim 1, wherein the sorting by the sorting part is sorting between different conveyance paths.

4. The image forming device according to claim 1, wherein in a case in which a determination result is acquired before a transfer medium on which the determination is performed is suspended at or in advance of the sorting position, the hardware processor does not suspend conveyance of the transfer medium.

5. The image forming device according to claim 1, wherein in a case in which a determination result is acquired during suspension of the transfer medium, the hardware processor resumes conveyance based on the determination result.

6. The image forming device according to claim 5, wherein the sorting is performed along with the resuming of the conveyance.

7. The image forming device according to claim 1, wherein the hardware processor is further configured to determine a feeding interval of a following transfer medium based on the analysis time obtained for a preceding transfer medium.

8. The image forming device according to claim 7, wherein the hardware processor sets the feeding interval such that a suspended transfer medium and a following transfer medium do not collide with each other.

9. The image forming device according to claim 1, wherein the hardware processor is further configured to:
perform post-processing setting, and
determine a feeding interval of a following transfer medium with respect to a preceding transfer medium by comparing an analysis time of the preceding transfer medium, an analysis time of the following transfer medium, and a post-processing time.

10. The image forming device according to claim 1, wherein the hardware processor compares an analysis time of a following transfer medium Ab and a post-processing time of a preceding transfer medium Ff, adds a difference therebetween to an analysis time of the preceding transfer medium, and sets this as a feeding interval of the following transfer medium in a case in which Ff≥Ab.

11. The image forming device according to claim 1, wherein the hardware processor compares an analysis time of a following transfer medium Ab and a post-processing time of a preceding transfer medium Ff, and sets an analysis time of the preceding transfer medium Af as a feeding interval of the following transfer medium in a case in which Ff<Ab.

12. The image forming device according to claim 1, further comprising the image reader that reads the image on the transfer medium formed by the image forming part.

13. The image forming device according to claim 1, further comprising the sorting part.

14. The image forming device according to claim 1, further comprising a post-processing device.

15. A transfer medium conveyance device comprising:
a conveyance part that conveys a transfer medium;
an image reader that reads an image on the transfer medium that has been formed by an image forming part;
a sorting part that sorts the transfer medium conveyed through the image reader; and
a hardware processor configured to:
control the conveyance part,
receive a result of reading by the image reader,
determine whether the image on the transfer medium is normal,
control the sorting part according to a result of the determination, to sort a transfer medium determined to have a normal image and a transfer medium determined to have an abnormal image,
obtain, before the determination, an analysis time required for the determination, and
control suspending of conveyance of the transfer medium at a conveyance position at or in advance of a sorting position according to the analysis time.

16. An image forming system comprising:
an image forming part that forms an image on a transfer medium;
a conveyance part that conveys the transfer medium;
an image reader that reads the image on the transfer medium formed by the image forming part;
a sorting part that sorts the transfer medium conveyed through the image reader; and
a hardware processor configured to:
control the conveyance part,
receive a result of reading by the image reader,
determine whether the image on the transfer medium is normal,
perform control of sorting a transfer medium determined to have a normal image and a transfer medium determined to have an abnormal image by controlling the sorting part,
obtain, before the determination, an analysis time required for the determination, and
control suspending of conveyance of the transfer medium at a conveyance position at or in advance of a sorting position according to the analysis time.

17. A non-transitory recording medium storing a computer readable program that is executable by a hardware processor that controls a conveyance part which conveys a transfer medium and that receives a result of reading by an image reader, the program causing the hardware processor to perform operations comprising:
receiving the result of reading by the image reader and determining whether an image on a transfer medium is normal;
controlling a sorting part according to a result of the determination, to sort a transfer medium determined to have a normal image and a transfer medium determined to have an abnormal image;

obtaining, before the determination, an analysis time required for the determination; and controlling suspending of conveyance of the transfer medium at a conveyance position at or in advance of a sorting position according to the analysis time.

* * * * *